Aug. 26, 1947. J. VAN H. WHIPPLE 2,426,478
DRILL GRINDER
Filed Sept. 1, 1942 10 Sheets-Sheet 1

INVENTOR
Jack Van H. Whipple
BY
Blair, Curtis & Hayward
ATTORNEYS

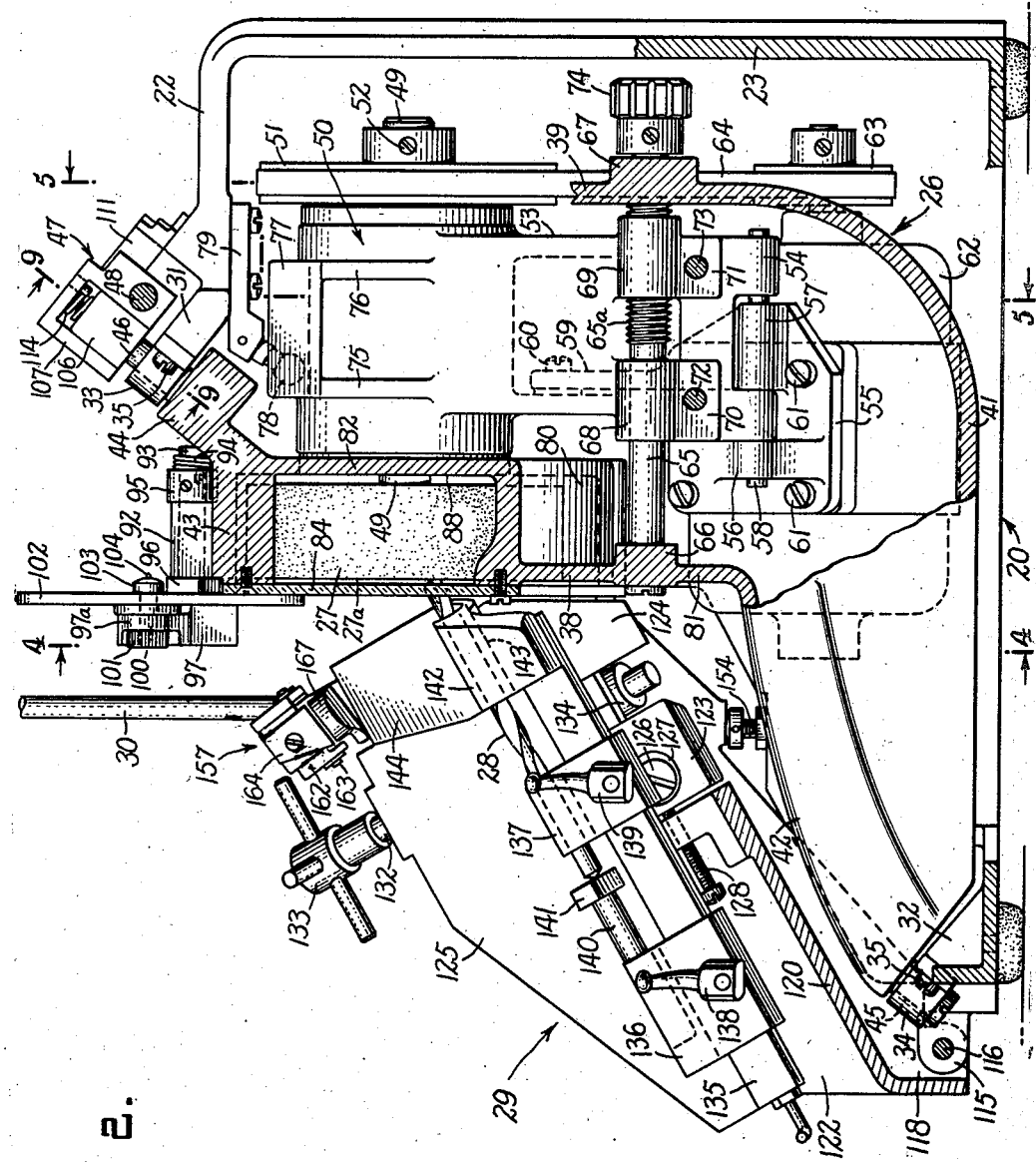

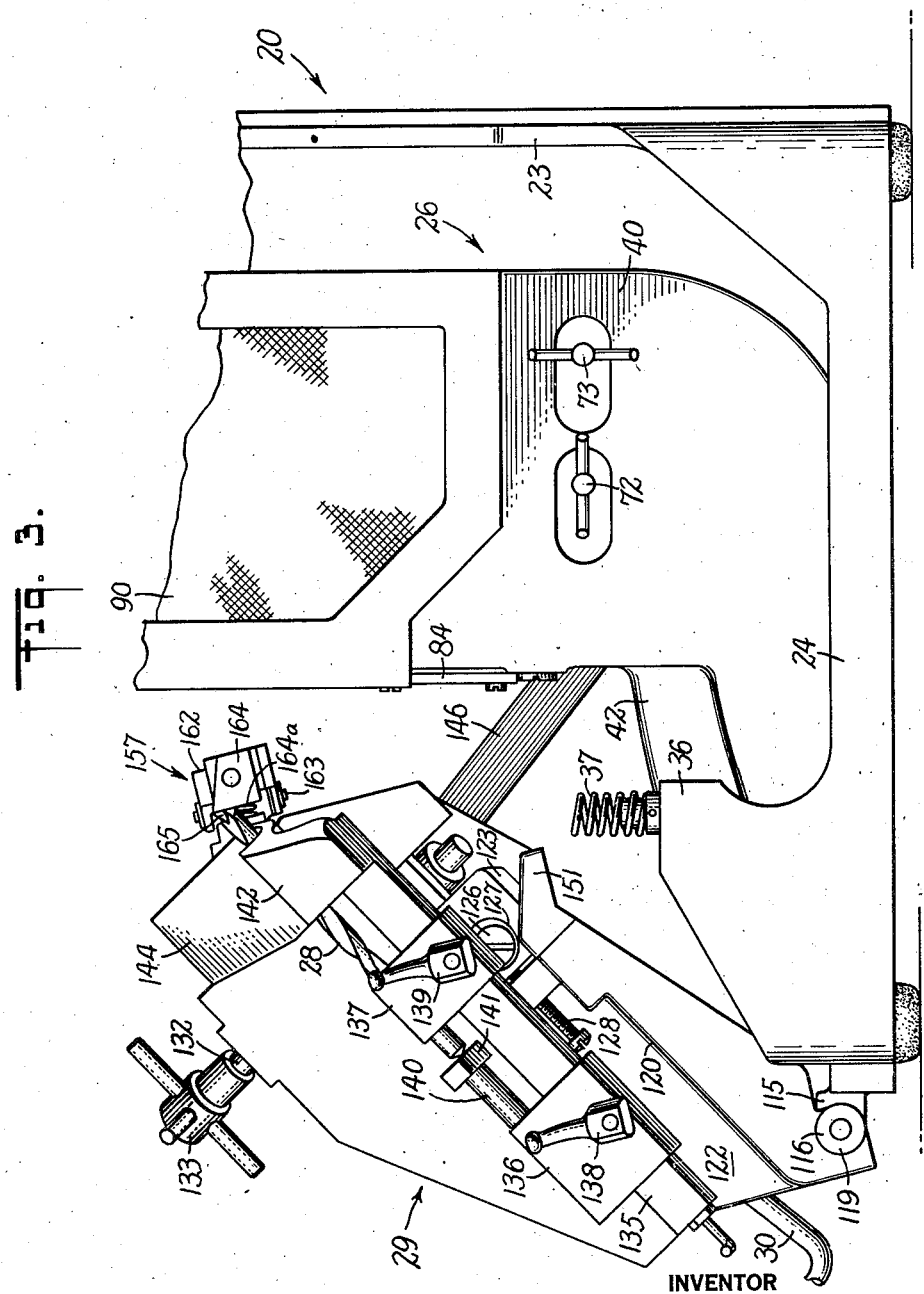

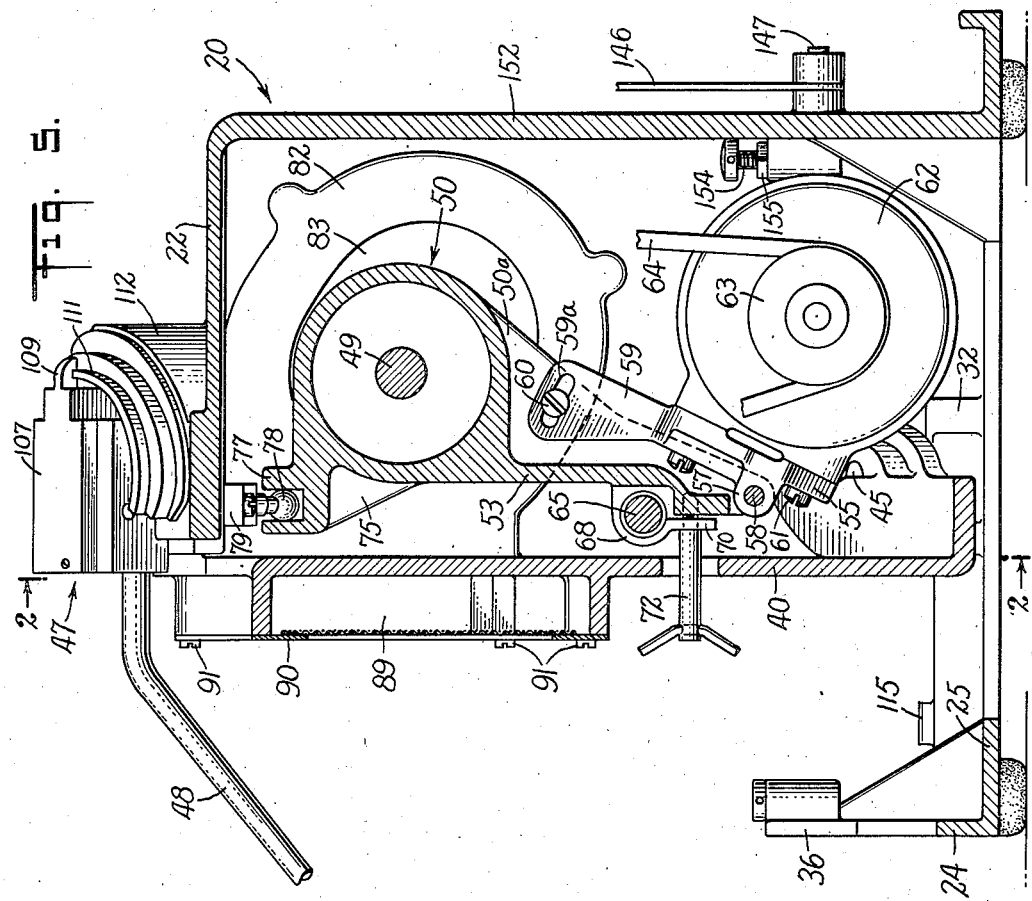

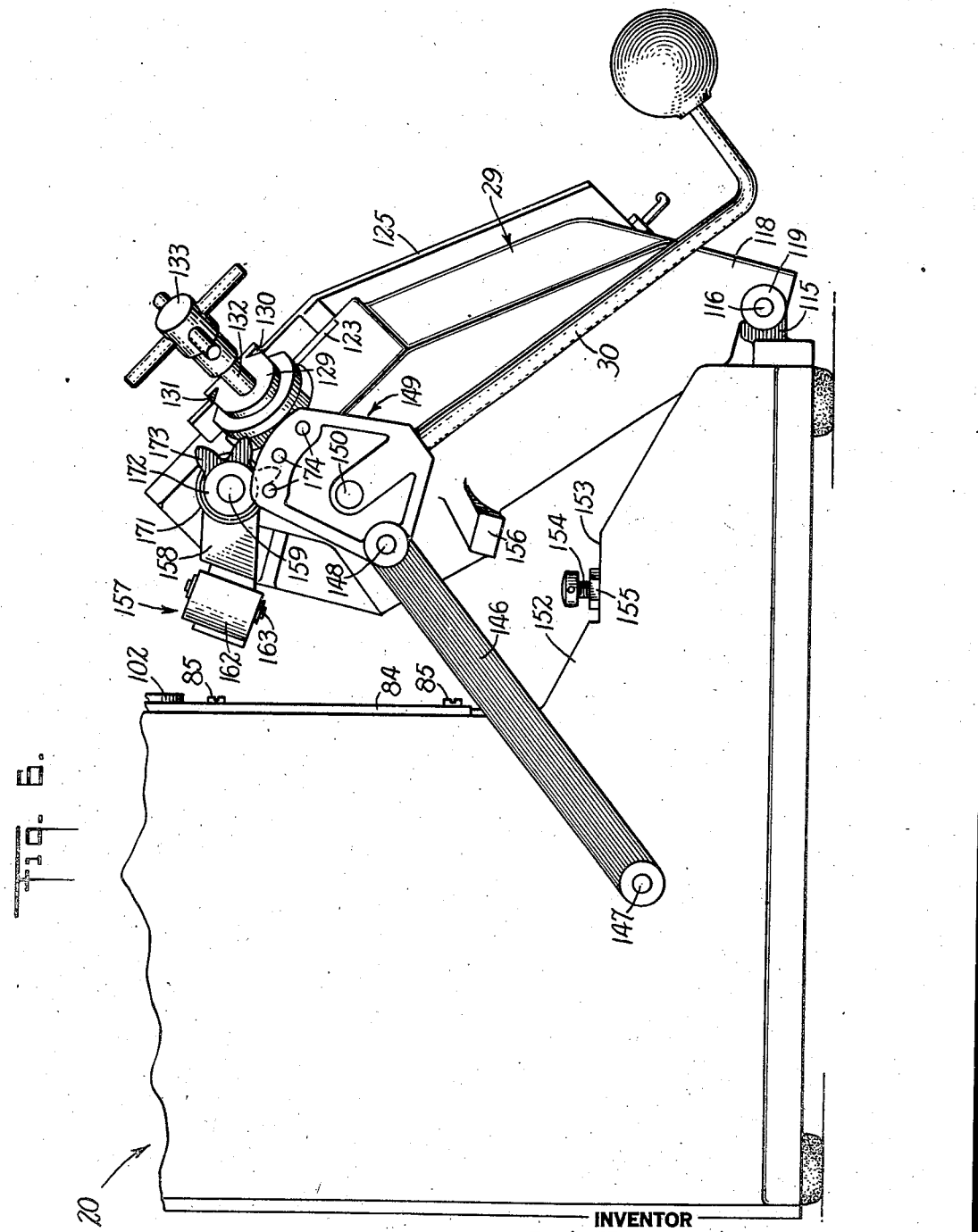

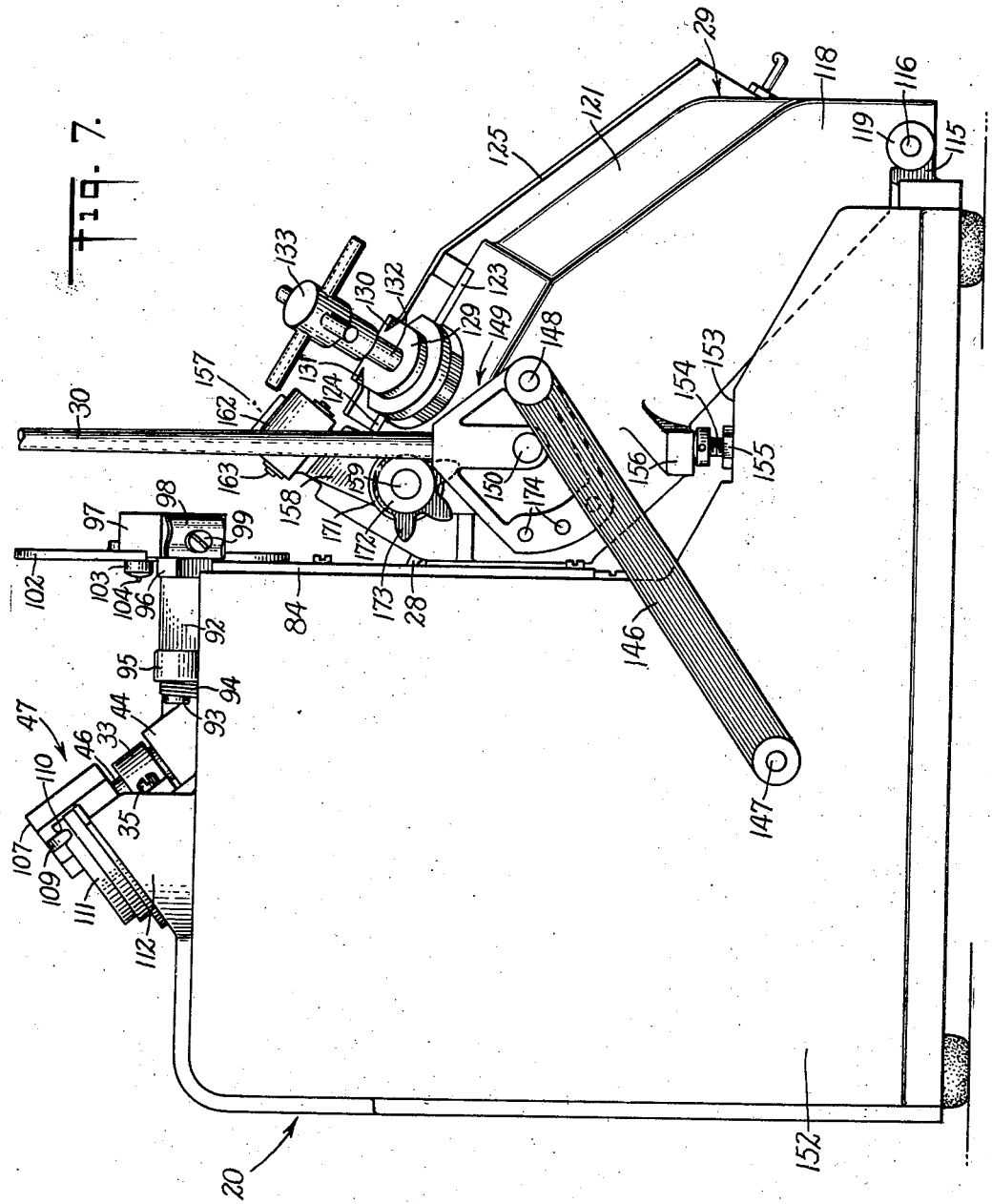

Aug. 26, 1947.     J. VAN H. WHIPPLE     2,426,478
DRILL GRINDER
Filed Sept. 1, 1942     10 Sheets-Sheet 7
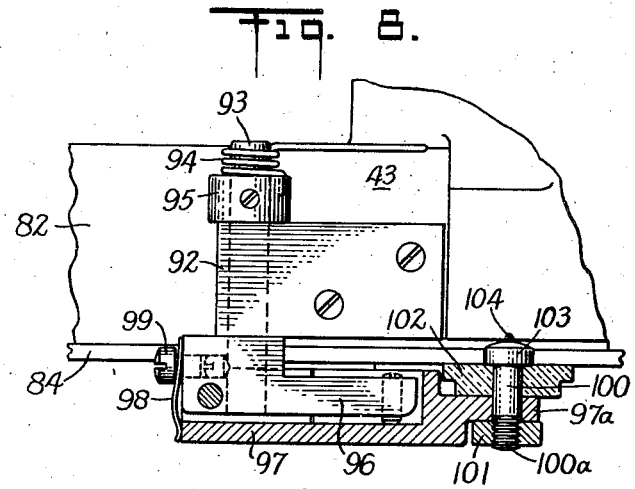
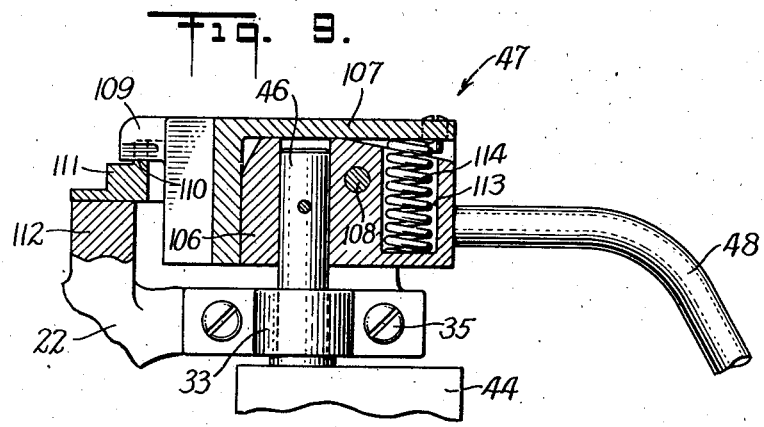
INVENTOR
Jack Van H. Whipple
BY
Blair, Curtis & Hayward
ATTORNEYS Aug. 26, 1947.  J. VAN H. WHIPPLE  2,426,478
DRILL GRINDER
Filed Sept. 1, 1942  10 Sheets-Sheet 8

INVENTOR
Jack Van H. Whipple
BY
Blair, Curtis & Hayward
ATTORNEYS

Patented Aug. 26, 1947

2,426,478

UNITED STATES PATENT OFFICE 2,426,478

DRILL GRINDER

Jack Van H. Whipple, New York, N. Y.

Application September 1, 1942, Serial No. 456,874

4 Claims. (Cl. 51—55)

This invention relates to apparatus for sharpening the point of a twist drill.

One of the objects of this invention is to provide apparatus for sharpening the point of a twist drill, i. e. a drill pointer which is steady and compact in construction and capable of efficient operation over an extended period of time. Another object is to provide a drill pointer which requires no skill in operation and which is able to sharpen correctly the points of drills of a wide variety of sizes. Other objects will be in part apparent and in part pointed out hereinafter.

The invention accordingly consists in the features of construction, combinations of elements and arrangements of parts as will be exemplified in the structure to be hereinafter described, and the scope of the application of which will be indicated in the following claims.

In the drawing, wherein there is shown one embodiment of my invention,

Figure 2 is a fragmentary sectional elevation taken along the line 2—2 of Figure 5;

Figure 3 is a fragmentary side elevation of the drill pointer showing the drill holder in its retracted or loading position;

Figure 4 is a sectional elevation taken along the line 4—4 of Figure 2;

Figure 5 is a sectional elevation taken along the line 5—5 of Figure 2;

Figure 6 is a fragmenetary elevation of the side of the machine opposite to that shown in Figure 3, also showing the drill holder in its loading position;

Figure 7 is a view similar to Figure 6, but showing the drill holder in drill sharpening position;

Figure 8 is a section taken along the line 8—8 of Figure 4;

Figure 9 is a section taken along the line 9—9 of Figure 2;

Similar reference characters refer to similar parts throughout the various views of the drawing.

The invention accordingly consists in the features of construction, combinations of elements, and arrangements of parts as will be exemplified in the structure to be hereinafter described, and the scope of the application of which will be indicated in the following claims.

It is commonly known that unless a twist drill is so sharpened that its cutting lips are of equal inclination and length, the drill will cut off center and accordingly oversize the hole being drilled, and also will be subjected to excessive forces which tend to bend, break or burn the drill. A good drill point, as will be more fully described below, is so formed from the axis of the drill that its cutting edges or lips are inclined from the drill axis by an equal amount and are of the same length. Unless the surfaces of the drill point are properly formed, the drill point is incapable of cutting to its best advantage and will either ride over the work and burn, or will be so weakened as to be unable to withstand the pressure ensuing from operation. Most drills are pointed at the same angle, usually on the order of 59°, regardless of the size of the drill, except in the case of particular specifications where it is desired to taper the bottom of a hole at a specified angle, or where the character of the material being operated on is particularly adapted to a greater or lesser cutting lip inclination. Such special conditions, of course, necessitate a specially ground drill point, whereas the invention herein concerned relates more particularly to standard ground points, although not necessarily limited thereto.

Figure 12:
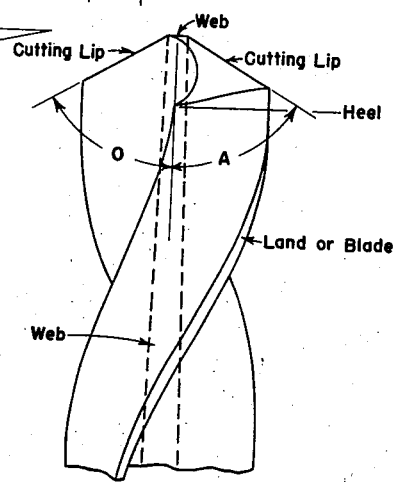

More particularly, and as shown in Figures 11-14, a twist drill comprises essentially its web, cutting lips, flutes, heel or lip clearance (Figure 11), point angle (Figure 14), margin, body clearance and land or blade (Figure 12). These several elements of the twist drill must be held dimensionally within close limits to assure efficient operation of the drill, and accordingly should be formed initially, and thereafter maintained, by tools of such precision as to be capable of so maintaining the drill. The apparatus and method hereinafter described in detail is particularly directed to the proper formation of the cutting lip, heel and back-off or lip clearance angle of the drill point. It is well known that unless these portions of the drill are carefully and accurately formed and maintained, the drill will not work satisfactorily.

The cutting lips (Figures 11 and 13) should incline at a predetermined angle $a$ (Figure 12) with the drill axis; each lip should have the same inclination and be of the same length; the lip clearance or back-off angle $c$, at the periphery, (Figure 11) should be sufficient to permit the drill to cut freely; and the clearance should be the same on both sides and increase toward the point of the drill, i. e. the lip clearance or back-off angle at point $x$, for example, should be greater in angularity than the angle $c$.

Hence, for average drilling (and it is average drilling with which this description is particularly concerned), the drill is usually ground to an angle of 118° (angle $oa$ in Figure 12), as experience seems to show that at this angle the thrust and torsion are most nearly equalized.

Theoretically, the lip clearance or back-off angle (Figure 11) of the drill should be just enough to permit the drill to cut freely, because excessive clearance weakens the cutting lips, restricts the area available for heat flow, and renders the drill point more subject to damage from vibration occurring during cutting. The necessary clearance angle $c$ at the periphery depends, to a certain extent, on the method of sharpening used, but in any case, and as noted above, the clearance angle must increase toward the center of the drill. That the clearance angle or back-off angle should vary is apparent when it is considered that any given point on the cutting lip of the drill follows a helical path. The angle of the path traversed by any point is smallest at the outer edge or circumference of the drill, and this angle increases for points nearer the center. This increase is due to the fact that a point nearer the center advances at the same rate as one on the outer edge; but the inner point rotates around a path of small diameter, thus increasing the helix angle or steepness of the path. This is true regardless of whether the line which generates the helix is normal to its axis of rotation or inclined with respect thereto, as in the case of a helix formed by the drill's cutting edge. Of course, the surface generated by combined rotation and translation of the cutting edge of a drill about and along its axis approximates a helix because of the displacement of the cutting edge of the drill from the drill axis due to the web of the drill, as will appear more clearly hereinbelow. Preferably the clearance angle should increase at the same rate toward the center, in order to have sufficient clearance along the entire cutting edge, without excessive clearance at any point.

The back-off angle referred to above (angle $c$, Figure 11) is often, in standard drills, on the order of about 12° (the optimum value) at the circumference of the drill. When the drill is to be used on softer metals, such as aluminum and the like, and where, accordingly, heavier feeds are possible, the clearance or back-off angle may be increased to about 15°. Where, on the other hand, tool steel, for example, is to be drilled, the amount of clearance should be diminished as a fine feed must necessarily be used, requiring a strong cutting edge and maximum material in the drill point to accommodate heat flow. But, for most purposes, a clearance or back-off angle of about 12° has been found satisfactory, and it is, accordingly, desirable that this particular angle be imparted to a drill point, regardless of the size of drill being sharpened. It thus becomes apparent that the clearance angle of a drill is an extremely important feature in drill grinding.

It has been found that the splitting of drills through the web is usually an indication either of incorrect clearance or excessive feed. If the end of a drill conforms exactly to the conical shape of the bottom of a hole which the drill might be supposed to cut, it is evident that the drill will, in fact, not cut, because the lack of clearance would make it impossible to send the cutting edges of the drill into the metal. Therefore, when there is insufficient clearance, the drill binds back of its cutting edge and is subjected to an excessive twisting stress which either burns the drill point or breaks the web. Hence, it is fundamental that a drill point should not only be provided with a proper clearance or back-off angle, but also that this clearance angle should increase gradually toward the center.

A common two-lipped twist drill has two cutting lips spaced 180° apart, and each inclined to the axis of the drill by an angle of approximately 59°. Due to the necessity of the drill's having a web of finite thickness, the cutting lips are not radial with respect to the drill's axis, but customarily lead a radial line by one-half of the web thickness and are parallel to it.

These cutting lips, when drilling a hole, have motion made up of two components, namely a rotation about the axis of the drill, and a motion of translation along the axis of the drill in the direction of the feed. The resultant of these two motions is a helix having a pitch equal to the feed per revolution. The paths in space described by the two cutting edges of a drill are two identical coaxial modified helices 180° out of phase respectively, and each identically modified from a true helix by having its generatrix displaced from its axis by an amount equal to one-half the web thickness.

Any cutting implement must have a cutting edge, and the implement must be so shaped that the cutting edge will bear into the material to be cut, without interference from other portions of the implement. In the case of the drill under consideration, it is evident that the metal which backs up and supports the cutting edge must not cut or bear on the surface of the material being cut.

Figure 16:
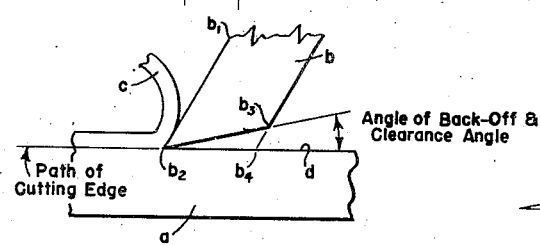
Figure 16 illustrates the operation of a cutting tool having straight line motion only.

Figure 16 illustrates this in the simplest case, i. e. a tool having a straight line motion only. In Figure 16, $a$ indicates the material being cut by the cutting tool $b$ which cuts from the material the chip $c$ to form the freshly cut surface $d$. The shape of the cutting tool is defined by the points $b$, $b_2$ and $b_3$, $b_2$ being the cutting edge and $b_3$ being the trailing edge or heel. In order that the cutting tool can bear on the material to be cut only at the cutting edge $b_2$, it is obvious that the shape of the tool cannot exceed the angle $b_1$, $b_2$, $b_4$. In other words, in practice there must be an actual angle of clearance between the back of the cutting tool and the freshly cut surface—as the angle $b_3$, $b_2$, $b_4$. This angle is often referred to as the angle of back-off.

Figure 17:
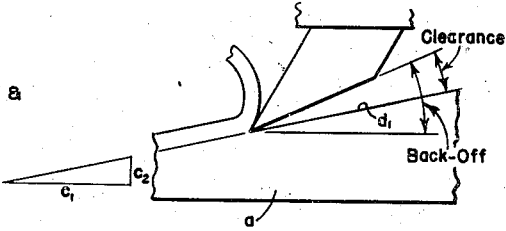
Figure 17 illustrates the motion of a cutting tool having both horizontal and vertical components of movement.

If the motion of the cutting edge is not horizontal, but has, as shown in Figure 17, a horizontal component $c_1$, and a vertical component $c_2$, then the freshly cut surface $d_1$ will have the same slope. In order for the cutting tool to act in the same way as pointed out in connection with Figure 16, the same clearance angle must be maintained. However, this clearance angle is measured between the back of the cutting tool and the freshly cut surface $d_1$. Therefore, the slope of the freshly cut surface must be added to the clearance angle to get the back-off angle.

Figure 18:
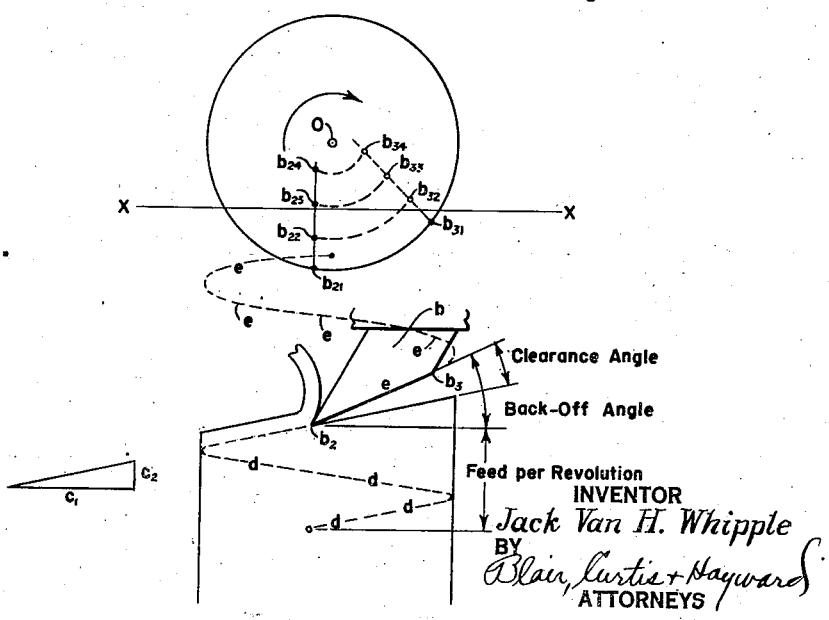
Figure 18 illustrates the movement of a twist drill, i. e. this figure shows the drill having both rotational movement and translation along its axis as it feeds into the work.

If the tool shown in Figure 17 be considered to have a motion of rotation instead of a motion of translation, the condition approaches that found in a drill, and as shown in Figure 18. In this case, the circle shown represents a hole being drilled by one lip $b_2$ of a twist drill $b$. The lower portion of Figure 18 represents a section taken along the line XX developed out in the plane of the paper. The cutting edge of the drill has a rotational component $c_1$ about the center O (upper portion Figure 18) and a vertical component $c_2$ equal to the feed per revolution. When the point $b_{21}$ of the drill's cutting edge rotates once about center O, it will also move downward by an amount equal to $c_2$, i. e. the amount of feed per revolution, and the drill point at the periphery will describe a helical path, as indicated by the dotted line $d$. Points on the cutting edge of the drill nearer the center thereof, such as points $b_{22}$, $b_{23}$ and $b_{24}$, will similarly describe helical paths, but since these points all move downward the same distance during one revolution, the paths which they describe will all be in one continuous helical surface.

If the back of the cutting tool from point $b_{21}$ to point $b_{31}$ is considered, it will appear that in order to maintain a constant clearance angle with respect to the freshly cut element ($b_{21}$—$b_{31}$), the shape of the line $b_{21}$—$b_{31}$ in space must be a part of a helix of steeper pitch than the helix of the freshly cut element. If the shape of the line $b_{21}$—$b_{31}$ were extended, it would appear as the dot-dash line $e$, and the pitch of its helix would be proportional to the sum of the clearance angle and the feed per revolution. The same is true with respect to elements $b_{22}$—$b_{32}$, $b_{23}$—$b_{33}$ and $b_{24}$—$b_{34}$. It is evident then that these helical paths all lie on a continuous helical surface which intersects the helical surface made by the freshly cut surface in a straight line with the cutting edge, and of steeper pitch than the freshly cut helix. The relation between the two helical surfaces is such that the angle between tangents drawn to the surfaces at the line of intersection and normal to that line make a constant angle which is equal to the clearance angle.

It is important in sharpening a drill point not to back off the point more than is necessary for clearance. The maximum amount of metal should be retained in the region of the heel of the drill ($b_3$ in the lower portion of Figure 18) which is consistent with adequate clearance in order first to provide maximum strength to back up the cutting edge, second to facilitate flow of heat away from the cutting edge where it is generated, and third, to minimize chattering of the cutting edge in torsional vibration. Hence the preferred shape in space for the backed off surface is part of a helical surface having a pitch greater than the pitch of the freshly cut surface by an amount proportional to the clearance angle.

Figures 19, 20:
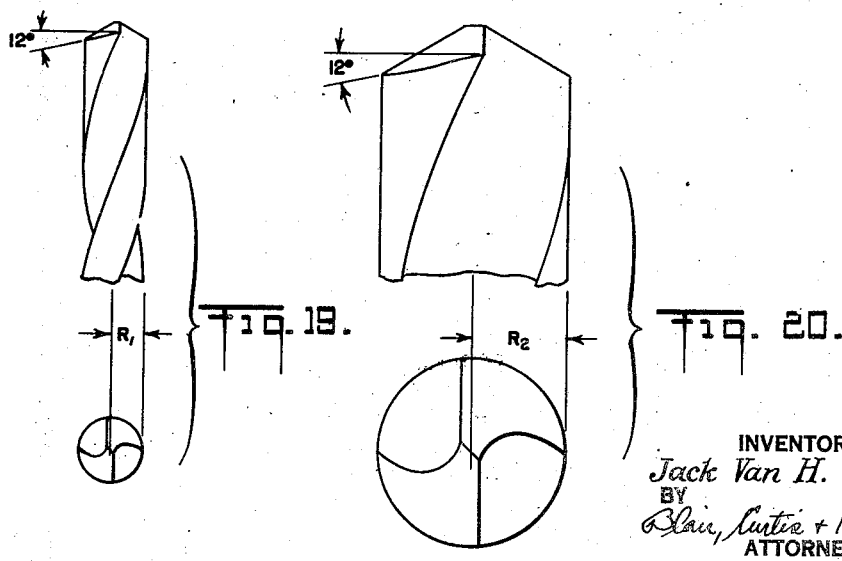
Figure 19 is a combined elevation and end view of a small twist drill.
Figure 20 is a similar view of a larger twist drill to illustrate that both drills have the same back-off angle at their outer peripheries.

It should be noted that the characteristics of the ideal back-off helical surface are different for every size or diameter of twist drill. For instance, a small diameter drill will have the minimum back-off angle (which experience has shown to be optimum at 10°–12°) at its outer periphery. A large drill also has the same minimum back-off angle at its outer periphery. This feature is illustrated in Figures 19 and 20, from which it will appear that the helical surface for the small drill, in Figure 19, making an angle of 12° with its axis at a distance $R_1$ from that axis, is a much different surface from the helical surface for the large drill shown in Figure 20, making the same angle 12° with its axis at a distance $R_2$. It is to be noted that the helical surface which is satisfactory for the small drill of Figure 19 having a radius of $R_1$, would be unsatisfactory if extended to the radius $R_2$ of the large drill (Figure 20) to form a helical surface for the large drill because the angle of back-off at the periphery of the large drill would not be 12° but something less, as will be readily seen when attention is called to the fact that the angle of back-off continuously decreases as the point at which it is measured progresses from the center outwardly.

It is a geometrical fact that a small portion of a helical surface may be closely approximated by a portion of a conical surface. It should be noted that the portions of helical surfaces required for the large and the small drill, while not identical, are geometrically similar and may therefore be approximated by portions of geometrically similar cones. If two cones are geometrically similar, they must have the same solid angle at the apex and are, in fact, formed from portions of the same conical surface. It further follows that if a rotating grinding wheel be moved as to generate part of a conical surface having the desired solid angle at its apex, that somewhere on that conical surface there is a portion which very closely approaches the surface of the ideal helical surface for each and every size drill, regardless of its diameter. I have found that a generating cone having an apex angle on the order of 78° is satisfactory, and I have further found that if the drill is presented to the cone in such a way that the axis of the drill and the axis of the generating cone lie in parallel planes but make an angle on the order of 20° with each other, and offset from one another as hereinafter described, and the cutting lip of the drill be in a plane parallel to that containing the generating cone axis, and the drill be advanced in the generating cone to a point where the projection of the side of the drill opposite to the cutting lip being ground intersects the apex of the generating cone, then the drill will be presented to the cone in such as position that the surface ground will be a close approximation to the ideal helical surface of back-off as described above.

Figure 21:
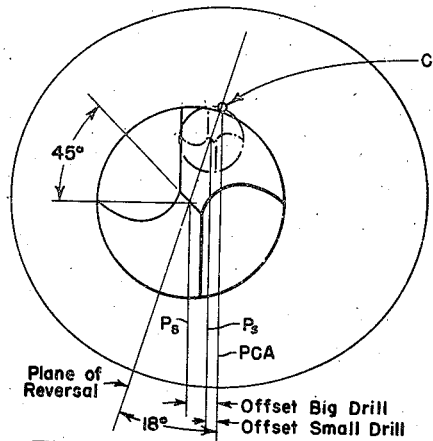
Figure 21 is a top plan view of a large and a small twist drill in relation to the generating cone, i. e. the path of operation of the grinding wheel; and, Figure 22 is a side view of the drills shown in Figure 21.
Figure 22:
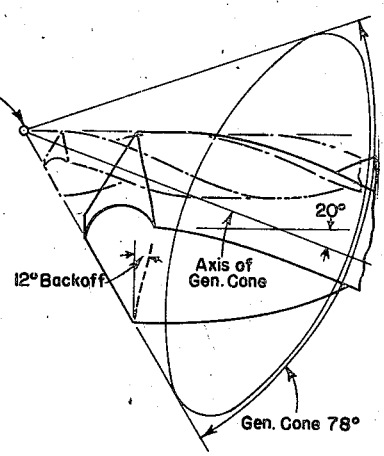

This will appear from a consideration of Figures 21 and 22. The plane containing the cone axis is shown in these figures in edge view, marked PCA (i. e. the plane containing the cone axis). The drill is so placed with respect to this plane that a plane containing the drill axis and parallel to the cutting lip being ground will be parallel to the plane containing the cone axis, and will intersect what I have termed the plane of reversal in a line which is coincident with the drill axis, and also that the projection of the side opposite the lip being ground intersects the apex of the cone. I have found that the angle between the plane of reversal and the plane PCA is on the order of 18°. If these conditions are adhered to, a drill of any size will be so positioned in the generating cone that the cutting lip will be backed off to meet the requirements hereinbefore described. In other words, regardless of the size of drill being ground, as long as the drill is positioned in the generating cone with its axis in the plane of reversal, and with its side adjacent a reference line passing through the cone axis apex, then the proper back-off angle will be imparted to the drill point. Thus, the points on the large and small drills shown in Figures 21 and 22 are geometrically similar. It might be noted in this connection that the smaller drill fits up higher in the cone than the larger one and so gets a surface with more curvature. Also, the amount of offset is reduced in direct proportion to the diameter of the drill.

Figure 15:
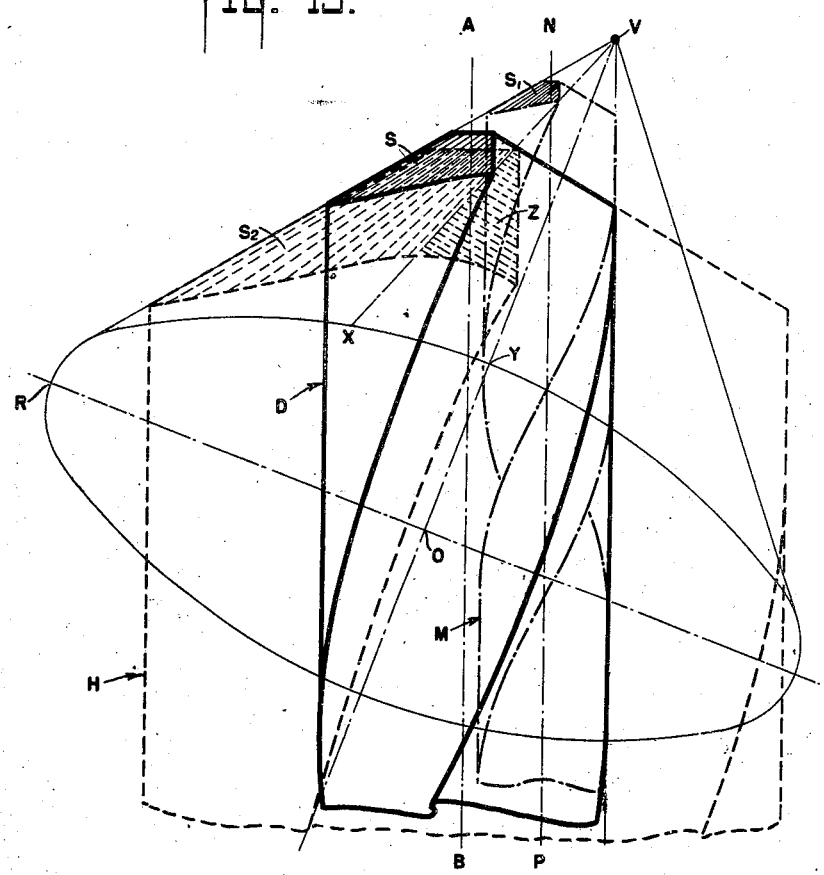
Figure 15 is a diagrammatic illustration of three twist drills of different sizes and their relationship to the operative path of the grinding wheel.

In Figure 15, I have illustratively shown the relationship between the aforementioned generating cone and a drill. Thus the cone may have an axis O—V, and radius O—R, and it may be seen that the cone axis O—V is inclined to the rear of and to one side of the axis A—B of the drill D. Also shown in this figure is the reference line V—C, which, it will be noted, is parallel to the drill axis A—B and tangent to the side of the drill, and furthermore passes through the vertex V of the generating cone. Thus, when drill D is set against the reference line V—C, and its point is ground by a wheel traveling along a path corresponding to the surface of the generating cone, the surface S is imparted to a portion of the drill point, and it is this surface which closely approximates the ideal helical surface heretofore described.

It will further appear from a consideration of Figure 15, that if a drill M of a size smaller than drill D is to be ground, and is set in relation to the generating cone in the same manner as drill D, i. e. if the side of the drill M is positioned tangent to the reference line V—C, the axis N—P of the smaller drill M will be displaced laterally of the axis A—B of the large drill D, or, in other words, the drill point will be positioned closer to the vertex V of the cone than is the point of the large drill D. But, because the fundamental relationship between the small drill M and the surface of the generating cone is the same as the relationship between the large drill D and the surface of the generating cone, the small drill will have its point ground to a surface $S_1$ geometrically similar to surface S of the large drill D. Hence, each of the drills D and M, having a point surface closely approximating the ideal helical surface, will have the proper back-off angle.

I have also shown in Figure 15 a drill H which is larger than drill D, but which is positioned in the generating cone at the same place as drill D. It will be noted that the right-hand side of drill H is not set against the reference line V—C, with the result that its point will be ground to the surface $S_2$. It can be seen that this surface $S_2$ is not geometrically similar to surfaces S and $S_1$ of drills D and M as it contains elements of the cone which do not pass along surfaces S and $S_1$. Thus, the cone elements lying between elements V—X and V—Y define a portion Z of surface $S_2$ which is improperly ground. Hence the surface $S_2$ of drill H does not have the proper back-off angle as it does not approximate the ideal helical surface.

Figure 1:
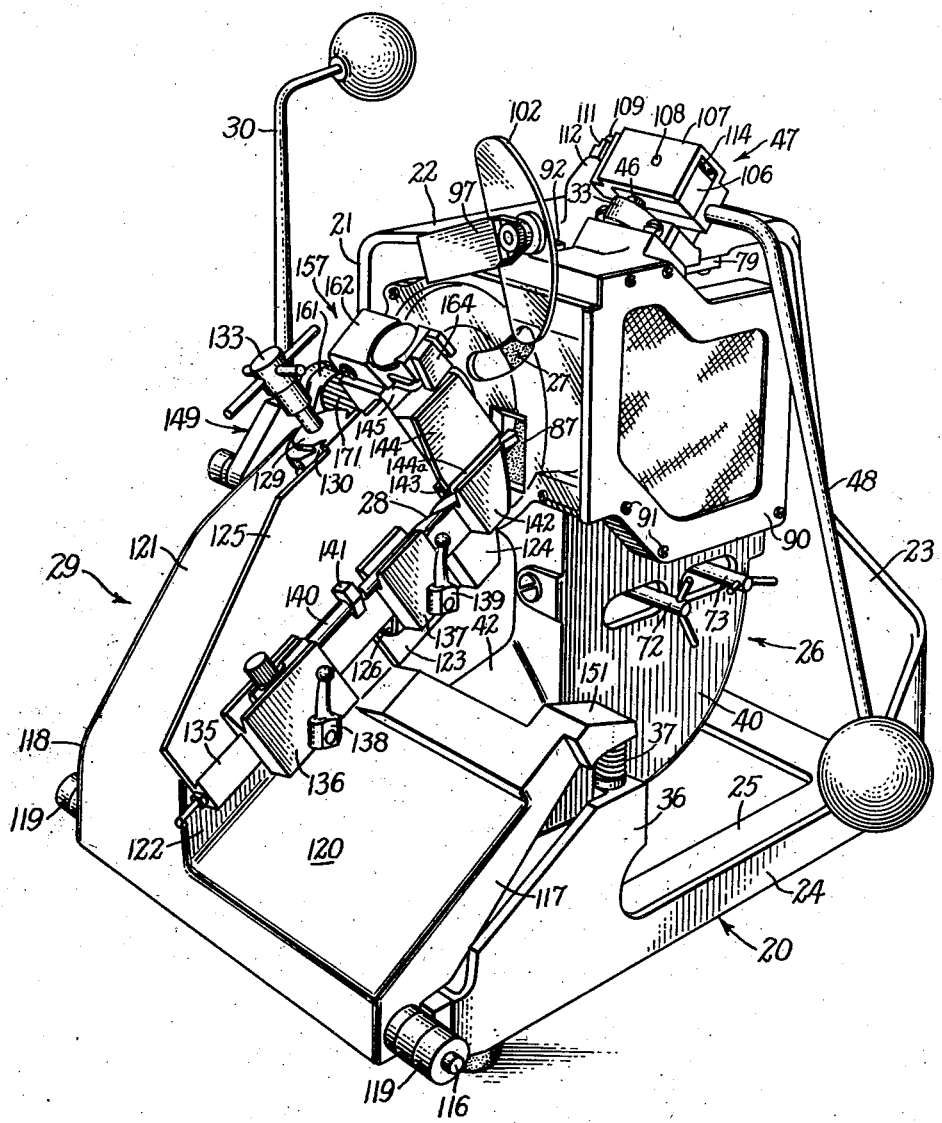
Figure 1 is a perspective view of my drill pointer.

Referring now to Figure 1, the various operating portions of the machine are supported in a housing generally indicated at 20, having a closed side 21, a top 22, a cut away rear side 23 and an open side 24, all formed preferably integrally with an open frame-like base 25 so that the entire housing may be cast as a single unit. A main swing frame, generally indicated at 26, is pivotally mounted in base 20, and, as will be more particularly described, carries a motor driven grind wheel 27 which, upon swinging movement of frame 26, sharpens the point of a drill 28 mounted in a drill holder generally indicated at 29. Drill holder 29 is also pivotally mounted on base 20 and, as will appear below, may be rocked toward and away from grind wheel 27 by a manually operable arm 30 during operation of the machine.

As shown in Figure 2, machine base 20 has formed thereon integral upper and lower bosses 31 and 32, to which are secured bearings 33 and 34, respectively, as by screws 35, which extend through flanges on the bearings and are threaded into the bosses. These bearings are, of course, coaxial and their axis is preferably inclined from the horizontal by that amount at which it is desired to incline the axis of the generating cone heretofore referred to. Base 20 (Figure 1) also preferably includes an upstanding side portion 36 to which a spring 37 is secured to form a resilient abutment for tool holder 29 when the tool holder is advanced into drill grinding position, as will be described more fully below.

The main swing frame 26 (Figures 1 and 2) comprises front and rear walls 38 and 39 (Figure 2), a side wall 40 (Figure 5) and a base 41 (Figure 2) which extends toward the front of the machine, as shown in Figure 2, to form a lower supporting arm 42. Swing frame 26 also includes a top 43 integral with which is a boss 44. Supporting arm 42 and boss 44 respectively carry pivot studs 45 and 46 which extend into bearings 34 and 33 to pivotably mount swing frame 26 in the machine base 20. As shown in Figure 1, upper stud 46 is elongated and has secured to the end thereof a fixture 47 which, as will be described below, includes a locking device for holding the swing frame against pivotal movement, but which may be pivoted to release the swing frame for swinging movement about its axis, i. e. the axis of studs 45 and 46, manually by an operating arm 48. It thus appears that the swing axis of swing frame 26 is the axis of the generating cone referred to. In other words, when swing frame 26, and accordingly grind wheel 27, are swung about the axis of the swing frame, i. e. the axis of pivot studs 45 and 46, the operating surface of the grind wheel generates a conical surface, a portion of which corresponds to that part of the drill which is ground by the wheel.

As shown in Figure 2, grind wheel 27 is preferably cup-shaped and accordingly has an angular abrading surface 27a, Figure 4. Wheel 27 is suitably secured to a shaft 49 which is journaled in suitable bearings mounted in a sub-frame generally indicated at 50. The other end of shaft 49 extends through sub-frame 50 and has attached thereto a pulley 51, this pulley being held on the shaft by set screws 52 extending through the pulley hub. As is more clearly shown in Figure 2, sub-frame 50 includes a pair of downwardly extending arms 53 joined by a web 54, the lower end of which is bifurcated. A motor bracket 55 includes integral upstanding bosses 56 and 57 through which a supporting pin 58 extends. Bracket boss 57 lies between the bifurcations of the web 54 of the sub-frame, and pin 58 extends through the bifurcations of the arm so as to attach the motor bracket thereto. As shown in Figure 5, motor bracket 55 also includes an upwardly extending arm 59 having an arcuate slot 59a formed therein through which a screw 60 extends and is threaded into a web 50a of sub-frame 50. Motor bracket 55 has secured thereto as by screws 61 a motor 62, the armature shaft of which has secured thereto a pulley 63 (Figure 2). Pulleys 63 and 51 are connected by a driving belt 64, whereby motor 62 may drive shaft 49 and accordingly drive wheel 27. To properly tension the driving belt 64 (Figure 4) screw 60 may be loosened to permit pivoting of motor bracket 55 and accordingly motor 62 about pin 58 so that when the proper belt tension is obtained, screw 60 may be tightened and thus hold the motor bracket in its adjusted position.

Sub-frame 50 (Figure 2) is pivotally mounted within main swing frame 26 by a shaft 65, the ends of which are respectively journaled in bosses 66 and 67 formed on opposite walls of the main swing frame. Web 54 of the sub-frame has formed thereon split bearings 68 and 69, through which shaft 65 extends and which accordingly provide the pivotal mounting of the sub-frame within the main frame. The lower portions of these bearings 68 and 69 are provided with lips 70 and 71 through which respectively extend screws 72 and 73 (see Figure 5) which are threaded into the lower end 54 of the sub-frame. When these screws are tightened so as to force bearing lips 70 and 71 (Figure 2) against the lower portion of the sub-frame, bearings 68 and 69 tightly clamp the sub-frame to shaft 65.

A portion 65a of shaft 65 is threaded, and these threads mesh with threads formed in bearing 69. The outer end of shaft 65 is provided with a knurled head 74 so that when screws 72 and 73 are loosened, shaft 65 may be rotated by head 74 in one direction or another so as to move the entire sub-frame 50 together with motor 62 axially of shaft 65, and hence change the position of grind wheel 27. These provisions are made for purposes to be hereinafter described.

The upper portion of sub-frame 50 has a pair of webs 75 and 76 extending outwardly therefrom, and these webs are bridged by an integrally formed channel 77 which receives the rounded head of a stationary stud 78 secured to and extending downwardly from a plate 79 bolted to the upper wall 22 of the machine housing. It will appear that when swing frame 27 is swung about its axis, the upper end of sub-frame 50 is held by the interengagement of channel 77 and stud 78 so that the axes of grind wheel 27 and shaft 65 shift relatively but always remain parallel to impart a traversing movement to the operating face 27a of the grind wheel to avert localized wear of the wheel. In other words, it is the provision of channel 77 and stud 78 which causes the sub-frame to pivot within the swing frame when the swing frame is swung about its axis during the movement of the swing frame, which causes a portion of the wheel face to generate the conical surface referred to. Inasmuch as the axis of the grind wheel, the pivotal axis of the sub-frame, and the motor axis always remain parallel, regardless of the position of the swing frame and are always normal to the plane of the cutting face of the grinding wheel, which plane is tangent to and contains an element of the generating cone, it is apparent that any relative movement between the wheel axis and the sub-frame axis, will result in a traversing motion of the wheel in the aforesaid plane and will not disturb or vary the line of tangency (generating line) between the generating cone and wheel face plane.

As shown in Figures 2, 4 and 5, the main swing frame 26 has a compartment 80 (Figure 2) formed in the upper front portion thereof by partitions 81 and 82, and the top 43 of the frame. As shown in Figure 5, partition 82 has an opening 83 of substantial size formed therein, and it is through this opening that wheel shaft 49 extends so as to support grind wheel 27 (Figure 2) within compartment 80. As may be seen from Figure 4, compartment 80 is considerably larger than wheel 27 in order to accommodate the traversing movement of the wheel during pivotal movement of the swing frame as described above. The outer side of compartment 80 is covered by a transparent shield 84 (Figures 2 and 4) which is secured directly to the swing frame as by screws 85 and which has a circular opening 86 and a rectangular opening 87 formed therein. The first of these openings is provided for the admission of air during the operation of the wheel, and the second opening admits the drill to the operating surface 27a of the grind wheel.

Shield 84 includes an extension 87 which is attached to the swing frame over the open side of a passage 88 to form a conduit which connects compartment 80 with a dust receptacle 89 formed on the right-hand side of the swing frame as viewed in Figure 1. The open side of dust compartment 89 is covered by a screen 90 attached to the side of the swing frame by screws 91. It will now appear that when a drill is being sharpened by grind wheel 27, the rapid rotation of the wheel draws air into compartment 80 through the opening 86 in shield 84, and this air picks up the dust formed by the abrasion of the drill point. The mixture of air and dust flows from compartment 80 through passage 88 into the dust receptacle 89, where the screen 90 passes the air but retains the dust which gathers in the bottom of the receptacle from which it may be periodically removed by removing screen 90. Preferably shield 84 is transparent so that the condition of the wheel and the dust passage may readily be observed.

With reference to Figures 2 and 8, the top wall 43 of main swing frame 26 has secured thereto a block 92 in the end of which a stud 93 is pivotally mounted parallel with the axis of the grind wheel when it is in the position shown in Figure 2. One end of stud 93 is encircled by a torsion spring 94 having one end connected to the stud and the other end connected to a stationary collar 95 (Figure 8) connected to stud 93 so that the stud is under a constant counterclockwise bias as viewed in Figure 4. The other end of stud 93 carries an arm 96 which is fixed to the stud so as to move therewith. This arm, in turn, is disposed within and pivotally connected to a box-shaped arm 97 which is constantly biased counterclockwise, as viewed in Figure 8, by a small leaf spring 98 attached to arm 96 by a screw 99. The movement of arm 97 toward arm 96 is limited by the adjustment of a set screw 96a threaded through arm 96 and provided for a purpose to be described. The free end 97a of arm 97 is drilled to receive a post 100, one end 100a of which is threaded and has attached thereto a knurled nut 101, and the other end of which extends through a dust shield 102 (Figure 2). The extreme right-hand end of post 100, as viewed in Figure 2, carries a diamond pointed dressing tool 103, the diamond point 104 of which is spaced from the right-hand face of dust shield 102 by an amount suitably in excess of the thickness of shield 84. It may now be seen that the dressing tool comprising diamond 104 and guide plate 102 are pivotally mounted on top of the swing frame and are constantly biased upwardly and outwardly from grind wheel 27 by torsion spring 94 and leaf spring 98.

As shown in Figure 4, shield 84 is provided with an arcuate slot 105, the length of which is substantially in excess of the width of surface 27a of the grind wheel, and the radius of which is the same as the distance between the axis of stud 93 and dressing tool post 100, so that when the dressing tool is swung clockwise as viewed in Figure 4 into wheel dressing position, the diamond point on the dressing tool may extend through shield slot 105 to engage surface 27a of the grind wheel. Through the provision of set screw 96a (Figure 8) the diamond point 104 may be accurately adjusted to its vertical plane of operation, i. e. the screw 96a may be adjusted to permit leaf spring 98 to force arm 97 and hence diamond point 104 counterclockwise (Figure 8) until the diamond point is brought exactly into its desired plane of operation, with the result that the dressing tool, as it is swung back and forth around its axis, always operates in the same plane, and, hence, the face 27a of the grind wheel after dressing is always located in that plane. Thus, the face of the wheel always lies in a predetermined, known position with respect to the drill holder 29. The purpose of this will be brought out hereinbelow.

After grind wheel 27 (Figure 2) has operated over an extended period of time, its surface 27a has been worn away so as to be out of contact with diamond point 104 of the dressing tool, when the dressing tool is swung into position. However, as noted hereinafter, the position of the grind wheel may be adjusted along its axis by rotation of shaft 65. Thus, screws 72 and 73 may be loosened to unclamp bearings 68 and 69 from about the shaft. Thereafter knurled head 74 may be rotated to move the entire sub-frame 50 and, accordingly, grind wheel 27 to the left, as viewed in Figure 2, so as to bring the operating face of the grind wheel slightly beyond the plane of action of diamond point 104 of the dressing tool. If desired, threads 65a on shaft 65 may have a micrometer pitch and graduations may be provided on the unknurled portion of head 74 so that the exact amount of movement desired of the grind wheel to the left may be made. After the wheel has thus been moved into position for dressing, screws 72 and 73 may be tightened so as to bind the sub-frame 50 in its new position. Thereafter arm 97 may be pivoted to the left, as shown in Figure 2, until the diamond point 104 is in a position to clear shield 84, whereupon the dressing tool may be swung downwardly to a position where the diamond point may enter slot 105 (Figure 4) of shield 84, and engage surface 27a of the grind wheel. The diamond point may then be traversed back and forth across the shield until arm 97 (Figure 8) engages screw stop 96a; the wheel thus being dressed back to its proper plane as described above.

As noted above, with reference to Figure 1, pivot stud 49 of the main swing frame 26 extends beyond its bearing 33 to carry fixture 47. This fixture (Figure 9) comprises a block 106 which is fixed to the end of stud 46 and which has pivotally secured thereto a box-shaped bracket 107 as by a pin 108. On the left-hand end of bracket 107 (Figure 9) is secured a latch 109 adapted to enter a niche 110 (Figure 7) cut in the upper end of an arcuate downwardly extending track 111 (Figure 5) secured to an upwardly extending boss 112 formed on the top 42 of the machine housing. As more clearly shown in Figure 9, block 106 has a hole 113 drilled therein, in which is disposed a compressed spring 114, the upper end of which bears against the top of bracket 107 so that the bracket is under constant counter-clockwise bias, as viewed in Figure 9, about its pivot pin 108. This constant bias maintains latch 109 in niche 110 when the swing frame is in its inoperative or reference position shown in Figure 1. The upper end of operating arm 48 is secured in bracket 107. Hence, when it is desired to operate swing frame 26, arm 48 may be depressed to lift latch 109 out of its niche against the bias of spring 114, whereupon arm 48 may be drawn upwardly to swing the swing frame about its axis.

As shown in Figure 2, the machine housing 20 has integrally formed on the base 25 thereof a pair of bosses 115 which carry a support shaft 116 (Figure 1) the opposite ends of which extend through the side walls 117 and 118 of drill holder 29, and on the ends of which are adjustable locating collars 119 which may be adjusted so as properly to position and fix the drill holder longitudinally on the shaft. Thus, the drill holder is pivotally mounted on machine housing 20 in an accurately predetermined lateral position, and may be rotated toward and away from swing frame 26, as will appear below.

The frame of drill holder 29 (Figure 1) comprises side walls 117 and 118 and top walls 120 and 121 which lie at different levels and are connected by an integral partition 122. A pair of ways 123 and 124 (Figure 2) are secured to partition 122 and provide a track for a face plate 125 which, as will be described, is adjustable up and down the ways. Way 123 is secured to partition 122 by a number of screws 126 which are countersunk in slots 127 in the way so that the way may be moved toward or away from way 124 to provide an adjustment of the space therebetween. Preferably a positioning screw 128 is provided to limit the spacing between the two ways and facilitate the adjustment thereof.

As shown in Figure 7, the closed side of face plate 125 has secured thereto a guide post 129 or the like having angularly related faces 130 and 131 adapted to fit between the angular opposed faces of ways 123 and 124 to be guided thereby during upward or downward adjusting movement of the face plate. Extending downwardly through guide post 129 is a shaft 132 which may be rotated about its axis by a hand wheel 133, but which is locked against axial movement relative to face plate 125 by a collar 134 pinned to the lower end of the shaft below a suitable flange (not shown) on the frame of drill holder 29. As may be seen in Figure 7, shaft 132 extends downwardly through that portion of the drill holder frame covered by top wall 121, and secured to the shaft within the drill holder frame is a worm wheel (not shown). This worm wheel meshes with a rack (not shown) formed on the closed face of face plate 125 so that upon rotation of shaft 132, and accordingly the worm wheel, by operation of hand wheel 133, the face plate 125 may be raised or lowered depending upon the direction of rotation of the shaft. As is shown in Figure 1, the plane of face plate 125 is inclined from the vertical and the purpose and amount of this inclination will be explained below.

As shown in Figures 1 and 2, face plate 125 is also provided with a way 135 along which are slidably mounted a back stop 136 and a drill rest 137. Back stop 136 may be tightened on way 135 through manipulation of a swing nut 138, and is mounted reversably to provide for either long or short drills. Drill rest 137 is similarly provided with a swing nut 139 for the same purpose. Thus, the back stop and drill rest may be positioned, as desired, on the face plate way 135 and locked in their adjusted positions. Back stop 136 carries a horizontally disposed stud 140 provided with a foot 141 against which the shank end of drill 28 rests when the drill is clamped in sharpening position on drill holder 29. When the drill is so positioned, the drill rest 137 is adjusted so as to underlie and support the shank of the drill.

At the right-hand end of face plate way 135, as viewed in Figure 1, is a chuck jaw 142 provided with a V-shaped slot 143 in which the fluted portion of the drill is clamped when the drill is in position to be sharpened. An upper chuck jaw 144 is attached to an integral portion 145 of the frame of the drill holder 29, and thus is follows that chuck jaw 144 is stationary, whereas jaw 142 moves up and down with adjustment of face plate 125 by rotation of hand wheel 133 so as to accommodate drills of various sizes. The lower portion of stationary jaw 144 is provided with a knife edge 144a, against which the top of the drill is clamped by upward movement of jaw 142. From this it will appear that regardless of the diameter of the drill in the drill holder, the top edge of the drill will always lie in the same position, but the axis of the drill may lie in any one of a plurality of positions all parallel to face plate 125. Furthermore, because of the inclination of face plate 125, the axis of a large drill will lie more to the right of a vertical plane passing through knife edge 144a of chuck jaw 144 than will the axis of a small drill. This lateral displacement of the drill axis in accordance with the diameter of the drill being ground is important in imparting to the drill point the various critical angles hereinafter mentioned, regardless of the size of drill being ground. It is by reason of this proportional (to diameter of drill) lateral displacement of the drill axis with respect to the apex of the generating cone that makes it possible for the machine to grind similar points on all drills regardless of diameter within the range of the machine.

As has been noted hereinbefore, drill holder 29 (Figure 1) may be swung toward and away from grid wheel 27, i. e., the drill holder may be swung from a loading position spaced from the grind wheel to a working position where the wheel and drill point are in engagement. To control this movement of the drill holder, I have provided (see Figure 7) a link 146 pivotally connected at one end as by a stud and collar 147 to the side 152 of the machine, and at the other end as by a stud and collar 148 to a crank-like part generally indicated at 149. Crank 149 is in turn mounted on the end of a stud 150 which is pivotally secured in side 118 of the drill holder frame. Crank 149 also carries operating arm 30 by which the drill holder 29 may be manually rocked between its operative and inoperative positions.

In Figure 6, I have shown drill holder 29 in its loading position wherein it will be noted that the pivotal axes of link 146 and crank 149 are in alignment. When the operating arm 30 is raised from its position in Figure 6 to the position shown in Figure 7 where the drill holder 29 is in drill sharpening position, the initial relative movement between link stud 148 and crank stud 150 is such as to result in a rapid traverse of the drill holder from its loading position to the sharpening position. However, as the drill holder 29 nears its working position (Figure 7), the studs 148 and 150 near the positions shown so that continued counter-clockwise movement of operating arm 30 causes a relatively slow traverse of the drill holder toward the grind wheel so as to preclude jamming the drill into the wheel with such abruptness and force as to damage either or both. Further, to effectuate this slow traverse of this drill holder during the last stages of the travel of the drill holder toward the grind wheel, I provide the spring 37 (Figures 1 and 3) which underlies a foot 151 formed on top surface 120 of the drill holder frame. This foot, just prior to engagement between the drill and grind wheel, engages spring 37 so that the spring yieldingly opposes continued movement of the drill toward the wheel. This yielding resistance, together with the slow traverse described, affords not only protection against damage to the drill or wheel, but also provides extreme sensitivity which enables the operator to sharpen the drill in a more effective manner than might otherwise be possible. An additional important function of the spring is to preload the drill holder and associated parts with a load applied in the direction of the force resulting from the actual grinding of the drill so that all slack and deflection are taken up before grinding begins. This increases the accuracy with which the machine can do its work.

When the operator has moved drill holder 29 to the position shown in Figure 7, and also Figure 1, the point of drill 28, assuming that it has been properly positioned in the drill holder, is in engagement with the operating face of grind wheel 27. Thereupon, swing frame 26 may be rocked about its axis by manipulation of arm 49, and accordingly the grind wheel 27 will be moved over the point of the drill along the conical path hereinbefore referred to.

As shown in Figures 6 and 7, side wall 152 of the machine housing 20 is provided with a small platform 153 into which is threaded the end of a stop bolt 154, and this bolt may be locked in its adjusted position by a lock nut 155. The top of the bolt is adapted to be engaged by a lug 156 which is integrally formed with and extends from side wall 118 of the drill holder 29. By reason of the vertical adjustment of which stop bolt 154 is capable, counterclockwise movement of the drill holder toward the grinding wheel may be positively limited, so that the drill and the drill holder can be moved to a limited, predetermined position. Thus, assuming that the drill has been properly positioned in the drill holder, the movement of the drill holder toward the machine from the position shown in Figure 6 to that shown in Figure 7, not only results in engagement between the grind wheel and the drill, but limits the extent of the engagement so that it is impossible to feed the drill too far into the generating cone, which would result in undesirable distortion.

Figure 10:
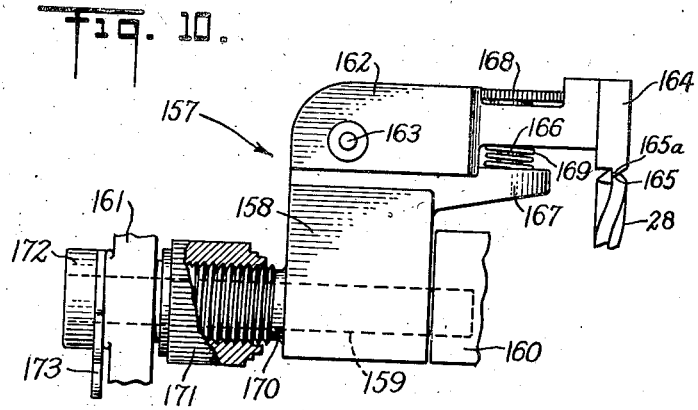
Figure 10 is a fragmentary top plan view of the drill stop in its drill locating position when the drill holder is in its loading position.
Figure 13:
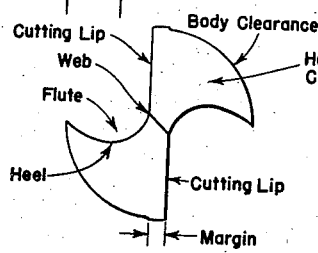
Figures 11, 12, 13 and 14 are elevation and end views of a twist drill illustrating the various operating portions thereof.
Figure 14:
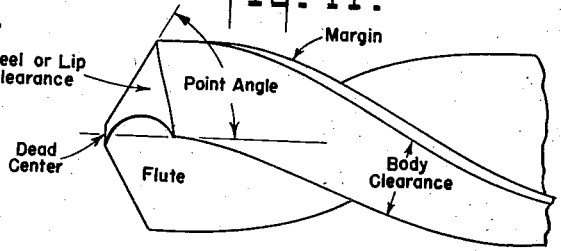
Figure 11:
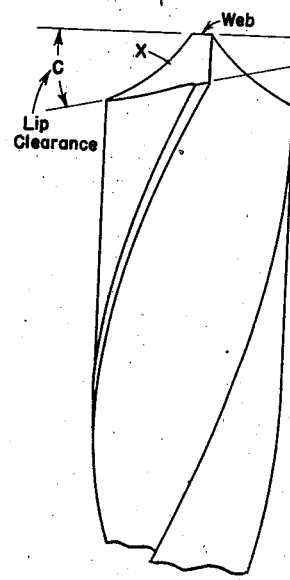

In order to assure both proper axial and radial positioning of drill 28 in drill holder 29 (Figure 1)

with respect to grind wheel 27, when the drill is forced into engagement therewith, I have provided a drill stop generally indicated at 157, by which the amount to be ground off the point of the drill can be accurately predetermined. As is more clearly shown in Figure 10, drill stop 157 includes a bracket 158 which is secured to, so as to rotate with a shaft 159. The right-hand end of this shaft, as viewed in Figure 10, is journaled in a flange 160 which is preferably integral with and extends from the drill holder housing. The other end of shaft 159 extends through an upstanding lug 160 which is also preferably integral with and extending from the drill holder housing.

On the outer end of bracket 158 is pivoted an adjustable arm 162 as by a pin 163 which extends through the arm and a portion of the bracket. The free end of arm 162 has secured thereto an anvil 164 against which the point of drill 28 is set when the drill holder is in its loading position shown in Figure 3. When drill stop 157 is pivoted into its drill stopping position, the position shown in Figure 3, the drill point engaging surface 164a of anvil 164 bears the same angular relationship to the axis of the drill as does the operating face of the grind wheel when the drill is in engagement therewith, so that one of the cutting lips of the drill is flush against anvil surface 164a. In this manner the axial position of drill 28 relative to the grind wheel may be accurately predetermined.

Inasmuch as the grind wheel during its movement through the conical path hereinabove described engages only a portion of the drill point, i. e. that portion thereof extending between one cutting lip and its heel, it is important that the cutting lip first engaged be properly positioned with respect to the grind wheel preliminary to grinding operation. It is desirable that the cutting lip to be ground be positioned in a vertical plane to assure proper engagement between the drill point and grind wheel at the beginning of the sharpening operation. To facilitate the proper positioning of the drill in the drill holder, anvil 164 (Figure 10) is preferably provided with a projection 165 which extends outwardly of stop face 164a of the anvil (see Figure 3) and which has a stop surface 165a against which the upper cutting lip of drill 28 may be set when the drill is placed in the drill holder. Thus, the lower cutting lip may be placed in a vertical plane and accordingly assures a similar location of the other cutting lip which is angularly displaced from the upper by 180°. It will now appear that through the provision of anvil face 164a (Figure 3) and projection 165, the proper axial and radial position of drill 28 relative to the grind wheel may be rapidly and easily made. When the drill has been so positioned, it is but a simple matter to clamp it firmly in the chuck through manipulation of hand wheel 133.

As shown in Figure 10, the right-hand end of arm 162 of the drill stop has extending therethrough a shaft 166 the lower end of which is threaded into a projection 167 of bracket 158, and the upper end of which is provided with a knurled head 168. A spring 169 is interposed between bracket projection 167 and the end of arm 162 so as constantly to bias the arm counterclockwise, as viewed in this figure. Thus, upon rotation of knurled head 168 in one direction or the other, the angular position of arm 162 may be adjusted as desired so as to move the locating face 164a (Figure 3) of anvil 164 relative to the operating face of the grind wheel and thus permit relative positioning of the drill point with respect to the grind wheel, so as to predetermine the amount of metal to be ground from the drill point during the sharpening operation. If desired, knurled head 168 (Figure 10) may be provided with graduations (not shown) and the threads on the end of shaft 166 may be of micrometer pitch to permit ultra-sensitive adjustment of the anvil.

Inasmuch as drill holder 29 is capable of gripping drills of various sizes, I have provided an adjustment for drill stop 157 (Figure 10) axially of shaft 159 so as to enable surface 165a of anvil projection 165 to be moved to the right or left, as viewed in Figure 10, in order that this surface may be properly positioned to engage the upper cutting lip of any size of drill. To this end, bracket 158 has a threaded projection 170 which extends into a threaded nut 171 rotatable about the projection and about shaft 159, but fixed axially with respect to the shaft, in any suitable manner. It will thus appear that upon rotation of nut 171 in one direction or the other, bracket 158 and accordingly anvil 164 may be moved laterally until projection surface 165a of the anvil is in its proper position to engage the upper cutting lip of drill 28.

As hereinbefore noted, drill stop 157 is pivotable out of the position shown in Figure 3 when the drill holder 29 is traversed toward the grind wheel. As shown in Figure 10, the left-hand end of shaft 159 has secured thereto a hub 172 to which is fixed a gear segment 173. While I have shown this gear segment in Figures 6 and 7 as being provided with three substantially spaced teeth, it is to be understood that any suitable number of teeth may be used. These teeth are respectively and successively adapted to engage short studs 174 secured to and extending from crank 149 (Figure 6) during movement of drill holder 29 toward and away from the grind wheel by the heretofore described manipulation of lever 30. Thus, when the drill holder is traversed from its loading position, shown in Figure 6, to its operating position, shown in Figure 7, the lower and middle teeth of gear 173 are successively engaged by the middle and right-hand studs 174, as viewed in Figure 6. As the teeth and studs engage successively, drill stop 157 is pivoted clockwise, as viewed in this figure, so that anvil 164 (Figure 3) is swung upwardly from the position shown in Figure 3 to the position shown in Figure 2, where it amply clears grind wheel 27 and guard 84.

As can be seen from Figure 7, studs 174 are out of engagement with the teeth on gear 173 during the slow traversing or drill holder 29 toward the grind wheel, and the studs do not engage the gear until after the clockwise movement of the drill holder, as viewed in Figure 7, has begun. Thus, it might be considered that studs 174 on crank 149 and gear 173 constitute a Geneva movement which provides a timed operation of drill stop 157 into and out of its drill stopping position.

To sum up the operation of the machine, drill holder 29 is placed in its loading position, as viewed in Figure 3, wherein drill stop 157 is automatically swung into proper position wherein the point of the drill 28 can be properly set. After the drill has been set, it is clamped in the drill holder through manipulation of hand wheel 133. Thereafter, the drill holder can be traversed first rapidly and then slowly through manipulation of arm 30 (Figure 1) and during this movement of the drill holder toward grind wheel 27, drill stop 157 is swung upwardly from between the drill holder and wheel in the manner described. Shortly before the drill point engages the grind wheel, foot 151 of the drill holder engages spring 37 on the machine housing so that the feeding traverse of the drill holder toward the machine is resisted to provide a more sensitive feed and to take up all slack. As soon as the point of the drill engages the face of wheel 27, arm 48 may be depressed to free the main swing frame 26 from its locked position. The swing frame may then be rocked about its axis through the generating cone heretofore described, by drawing upwardly on operating arm 48. If desired, during the swinging movement of the swing frame, the drill holder may be rocked gently back and forth through manipulation of arm 39 so as to avoid too heavy a cut during the initial movement of the swing frame. Thereafter, the swing frame may be rocked back and forth until the lower half of the drill point has been sharpened.

The upper half of the drill point is similarly sharpened after the drill has been partially released from the chuck, rotated 180°, and reset in proper adjusted position, as heretofore described.

It will now appear that I have provided a drill point sharpener which attains the several objects set forth hereinabove in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a drill pointer, in combination, a housing, means on said housing for holding a drill in a position to be ground, a rotatable grinding wheel, means mounting said wheel in said housing for swinging movement relative to the point of the drill, and means responsive to the swinging movement of said wheel for automatically moving said wheel in a plane perpendicular to its axis of rotation during said swinging movement to traverse a substantial portion of the operative surface of said wheel over the portion of the drill being ground to avoid local wear of the wheel face.

2. In a drill pointer, in combination, a housing, a grinding wheel operatively mounted in said housing, a drill holder pivotally mounted on said housing and pivotable from a loading position remote from said wheel to a final operating position adjacent said wheel, stop means on said drill holder for predetermining the location of a drill in the drill holder to predetermine the amount to be ground off the drill when said holder is in its operative position, means pivotally mounting said stop means on said drill holder, and means associated with said housing and said stop means for pivoting said stop means into its drill stopping position when said drill holder is pivoted away from said wheel and for pivoting said stop means away from its drill stopping position when said drill holder is pivoted toward said wheel.

3. A drill pointer capable of grinding a point on a twist drill with a predetermined backoff angle regardless of the drill diameter, wherein the drill is mounted in a holder having a fixed knifelike edge against which one edge of the drill is tangentially held by an adjustable jaw so that regardless of the size of the drill being ground a portion of its surface always lies along the same line defined by said knife edge, a grind wheel holder, a grinding wheel, means rotatably mounting said grind wheel in said holder, means mounting one of said holders for rocking movement relative to the other, said line being inclined with respect to the plane of the operative face of said wheel to define the angle to be imparted to the drill point, said line also intersecting the rock axis about which said one holder rocks relative to the other, the face of the grinding wheel lying in a plane passing through said intersection of said lines, this intersection defining the vertex of a conical surface generated by the relative movement between the face of the wheel and the drill point during which relative movement at any instant the line of engagement between the wheel face and the drill point comprises an element of said conical surface regardless of the relative positions of the wheel and the drill point so that regardless of the size of the drill being ground its ground surface lies in a portion of the conical surface generated by said relative movement wherein the grinding wheel holder rocks relative to the drill so that the operative face of the grinding wheel constitutes the cone generating factor, and means for moving the mounting means for said wheel in such a manner that the operative face of the wheel moves in a plane perpendicular to its axis of rotation during its rocking movement to traverse a substantial portion of its operative surface over the portion of the drill being ground.

4. In a drill pointer, in combination, a drill holder for holding a drill in a position to be ground, a grinding wheel holder for rotatably supporting a grinding wheel, a grinding wheel rotatably mounted in said wheel holder, means mounting one of said holders for swinging movement relative to the other, whereby the wheel and drill may be relatively moved to effect grinding of the drill point, and means responsive to relative movement between said holders for moving one of said holders in a plane perpendicular to the axis of rotation of said wheel to traverse a substantial portion of the operative surface of said wheel over the portion of the drill being ground to avoid local wear of the wheel face.

JACK VAN H. WHIPPLE.

REFERENCES CITED

The following references are of record in the file of this patent:

UNITED STATES PATENTS

| Number | Name | Date |
| --- | --- | --- |
| 777,247 | Dahl | Dec. 13, 1904 |
| 1,417,364 | Wallace | May 23, 1922 |
| 966,732 | Brinkmann | Aug. 9, 1910 |
| 1,020,860 | Vauclain | Mar. 19, 1912 |
| 1,324,497 | De Koning | Dec. 9, 1919 |
| 1,388,039 | Hinz | Aug. 16, 1921 |
| 1,586,523 | Heim | June 1, 1926 |
| 997,961 | Burleson | July 18, 1911 |
| 273,632 | Strong | Mar. 6, 1883 |
| 1,341,500 | Durham | May 25, 1920 |
| 1,367,686 | Connor et al. | Feb. 8, 1921 |
| 1,477,426 | Carlson | Dec. 11, 1923 |

FOREIGN PATENTS

| Number | Country | Date |
| --- | --- | --- |
| 9,930 | Great Britain | 1900 |
| 23,609 | Great Britain | 1908 |
| 455,661 | Great Britain | Oct. 26, 1936 |